United States Patent
Ravi et al.

(10) Patent No.: US 11,015,511 B2
(45) Date of Patent: May 25, 2021

(54) METHODS AND SYSTEM FOR DIAGNOSING ACTIVE EXHAUST VALVES BASED ON TEMPERATURE AND THERMAL IMAGE DATA

(71) Applicant: Ford Global Technologies, LLC, Dearborn, MI (US)

(72) Inventors: Vinod Kumar Ravi, Canton, MI (US); Sumanth Dadam, Dearborn, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 16/375,744

(22) Filed: Apr. 4, 2019

(65) Prior Publication Data

US 2020/0318521 A1 Oct. 8, 2020

(51) Int. Cl.
*F01N 11/00* (2006.01)
*F01N 1/18* (2006.01)
*G06T 7/00* (2017.01)
*F02B 75/22* (2006.01)
*H04N 5/33* (2006.01)
*F01N 1/16* (2006.01)
*F01N 13/08* (2010.01)

(52) U.S. Cl.
CPC ............ *F01N 11/002* (2013.01); *F01N 1/165* (2013.01); *G06T 7/001* (2013.01); *F01N 11/005* (2013.01); *F01N 13/087* (2013.01); *F01N 2550/06* (2013.01); *F01N 2560/06* (2013.01); *F01N 2560/14* (2013.01); *F02B 75/22* (2013.01); *G06T 2207/30164* (2013.01); *H04N 5/33* (2013.01)

(58) Field of Classification Search
CPC combination set(s) only.
See application file for complete search history.

(56) References Cited

U.S. PATENT DOCUMENTS

| | | | |
|---|---|---|---|
| 5,377,112 A | 12/1994 | Brown, Jr. et al. | |
| 8,099,948 B2 * | 1/2012 | Miyashita | F01N 3/2006 60/280 |
| 8,286,418 B2 * | 10/2012 | Demura | F01N 3/0814 60/284 |
| 9,109,483 B2 * | 8/2015 | Winkel | F01N 13/107 |
| 2002/0100273 A1 * | 8/2002 | Bubeck | F01N 13/011 60/287 |

(Continued)

FOREIGN PATENT DOCUMENTS

CN 103712929 A 4/2014

*Primary Examiner* — Binh Q Tran
(74) *Attorney, Agent, or Firm* — Geoffrey Brumbaugh McCoy Russell LLP

(57) ABSTRACT

Methods and systems are provided for diagnosing an active exhaust valve in an exhaust system based on thermal data. In one example, a method may include indicating degradation of a first active exhaust valve positioned in a first exhaust pipe of a first engine bank based on a difference between a first temperature of exhaust downstream of the first active exhaust valve and a second temperature of exhaust downstream of a second active exhaust valve positioned in a second exhaust pipe of a second engine bank. Degradation of the valve may be confirmed based on thermal image data acquired at outlets of the first and second exhaust pipes.

19 Claims, 7 Drawing Sheets

(56) References Cited

U.S. PATENT DOCUMENTS

| | | | |
|---|---|---|---|
| 2003/0061802 A1* | 4/2003 | Nakatani | F01N 3/0807 60/284 |
| 2007/0294999 A1* | 12/2007 | Yoshizaki | F01N 3/2093 60/274 |
| 2008/0115487 A1* | 5/2008 | Harada | F02G 5/02 60/320 |
| 2008/0209887 A1 | 9/2008 | Hanari et al. | |
| 2014/0168433 A1 | 6/2014 | Frank et al. | |
| 2018/0106205 A1* | 4/2018 | Jammoussi | F02D 41/024 |
| 2018/0128145 A1 | 5/2018 | Uhrich et al. | |

* cited by examiner

METHODS AND SYSTEM FOR DIAGNOSING ACTIVE EXHAUST VALVES BASED ON TEMPERATURE AND THERMAL IMAGE DATA

FIELD

The present description relates generally to methods and systems for diagnosing a condition of one or more active exhaust valves in an exhaust system of a vehicle based on temperature and thermal image data.

BACKGROUND/SUMMARY

An engine system for a vehicle may include an exhaust system with one or more exhaust ducts that are adapted to expect combusted exhaust gases to atmosphere (e.g., via one or more vehicle tailpipes). An active exhaust valve may be placed within each exhaust duct in order to control exhaust noise. For example, these valves may close in order to restrict air flow through the exhaust duct in which they are coupled, thereby controlling exhaust noise to a desirable level. In some examples, these valves may be positioned in the exhaust ducts, after a muffler. Quick diagnosis of the active exhaust valves before their degradation is not currently possible. However, early diagnosis of the functioning of these valves may help to mitigate degradation of the valves via corrective action.

Other attempts to address diagnosing valves positioned in an engine system include diagnosing the valves based on changes in temperatures upstream of the valve during select conditions. One example approach is shown by Uhrich et al. in U.S. 2018/0128145. Therein, an exhaust diverter valve positioned upstream of a muffler and used to regulate exhaust noise, as well as reduce emissions and expedite heating, is diagnosed based on changes in temperature upstream of the valve, during a cold start when the valve is closed. The temperature upstream of the valve during this specific condition is compared to a temperature upstream of the valve at engine start. However, the inventors herein have recognized potential issues with such systems. As one example, the exhaust diverter valve may only be diagnosed during select operating conditions (cold start when valve is close), and thus may not be diagnosed during all operating conditions, including when the vehicle is operating after the engine is warmed up. As a result, early diagnosis of the valve may not be possible. This may result in degradation of the valve before corrective action may be taken.

In one example, the issues described above may be addressed by a method for indicating degradation of a first exhaust valve positioned in a first exhaust pipe of a first engine bank based on a difference between a first temperature of exhaust downstream of the first exhaust valve and a second temperature of exhaust downstream of a second exhaust valve positioned in a second exhaust pipe of a second engine bank. In this way, quick and early diagnosis of the first exhaust valve may be achieved during a variety of engine operating conditions and valve positions.

As one example, the first and second exhaust valves may be active exhaust valves adjustable into open or closed positions to control exhaust noise to a desired level in a dual bank exhaust system. The first and second exhaust valves may be commanded into a same position (open or closed) to achieve the desired level of exhaust noise. As a result, the exhaust characteristics (e.g., temperature) downstream of the first and second exhaust valves should be similar if functioning properly. Thus, by performing a relative comparison of exhaust temperatures at exits of the first exhaust valve and second exhaust valve, it may be determined whether one of the valves is degraded and/or stuck in a position that is different than the commanded position. These exhaust temperatures may be measured temperatures or temperatures that are visualized via thermal images acquired at exits of the first and second exhaust pipes via infrared cameras. In this way, degradation and/or a stuck condition of one or more of the first and second exhaust valves may be diagnosed more quickly during engine operation, thereby reducing degradation to the valves and maintaining longer proper functioning of the valves. As a result, a driver's experience may be enhanced by providing the desired exhaust noise level.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
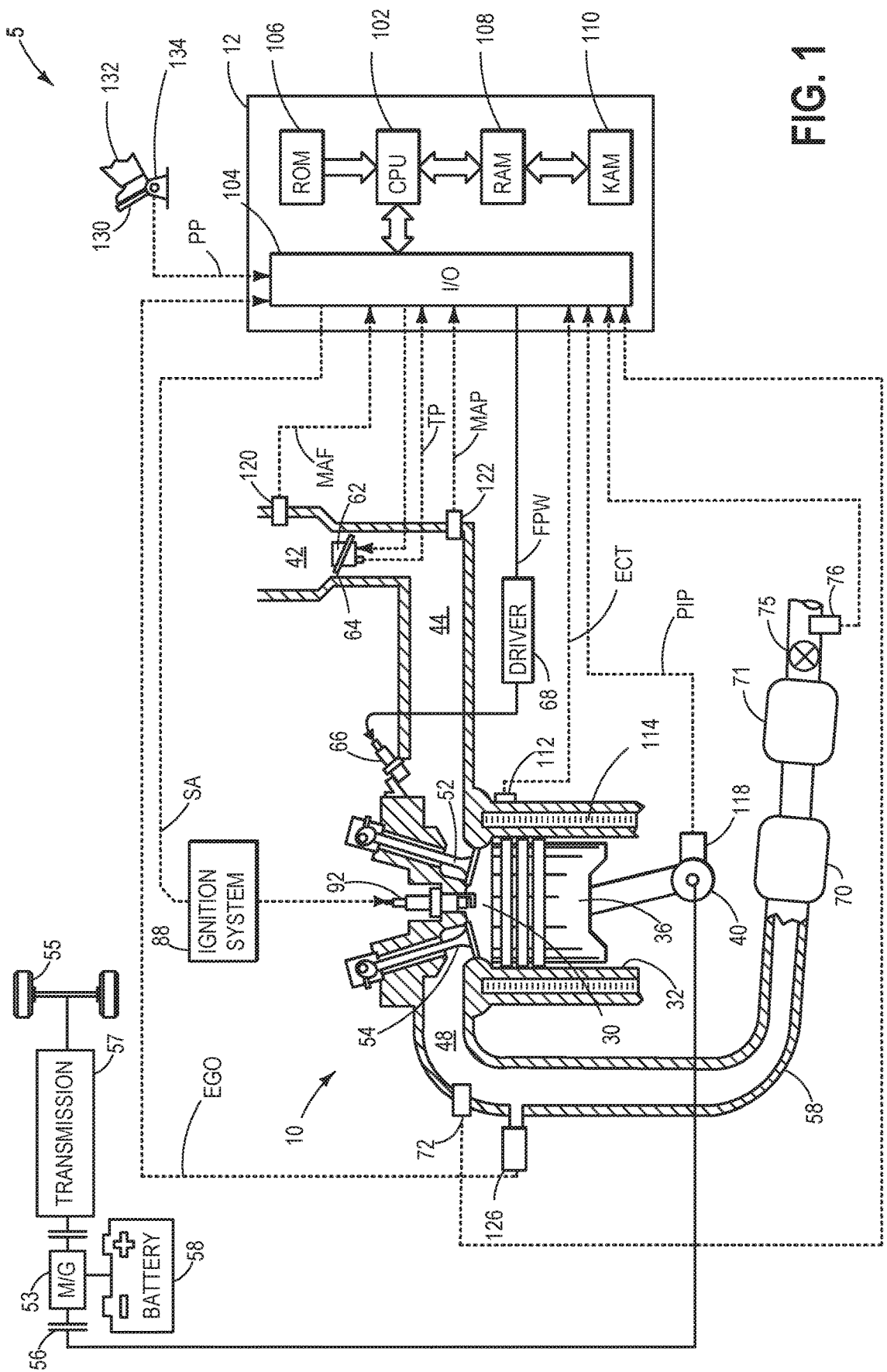
FIG. 1 schematically shows an engine with an exhaust system.
Figure 3:
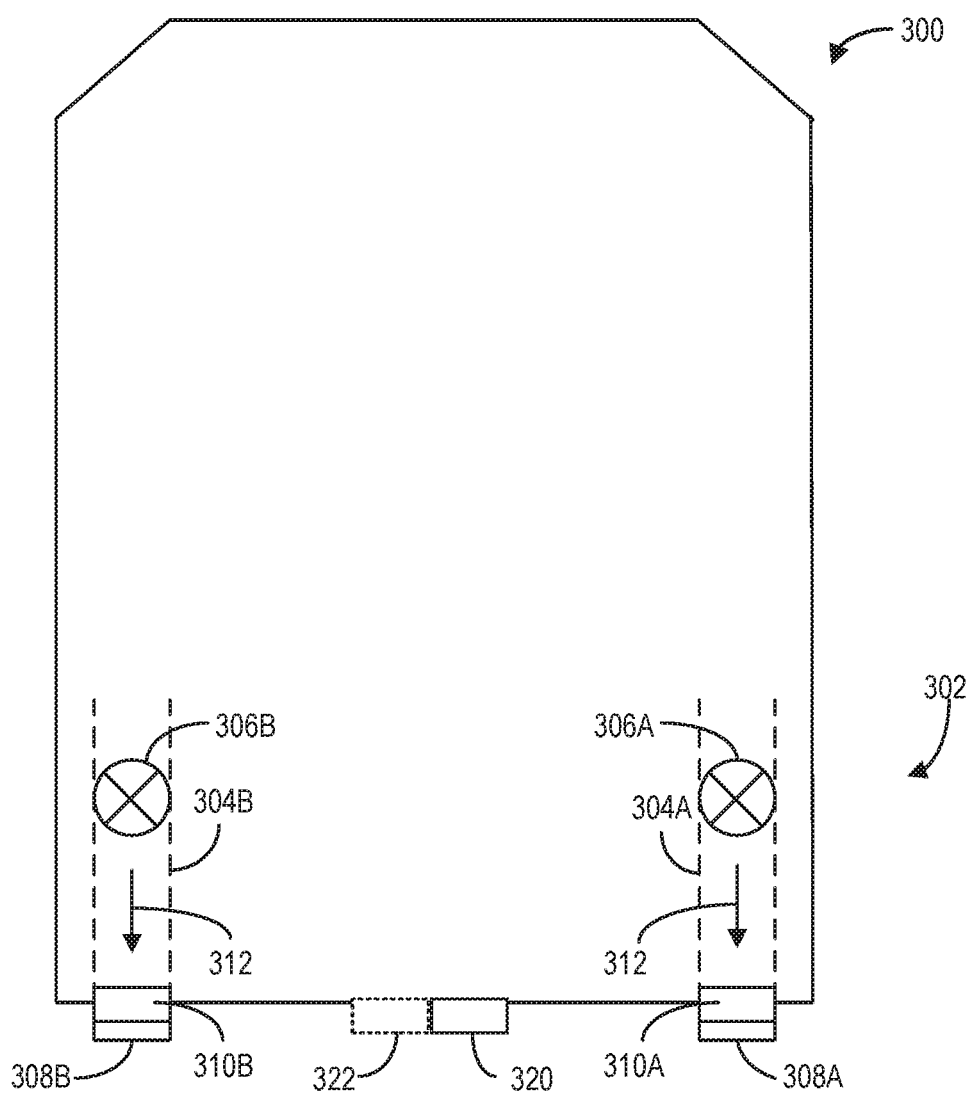
FIG. 3 schematically shows a vehicle including a dual bank exhaust system and an arrangement of infrared cameras.
Figure 4:
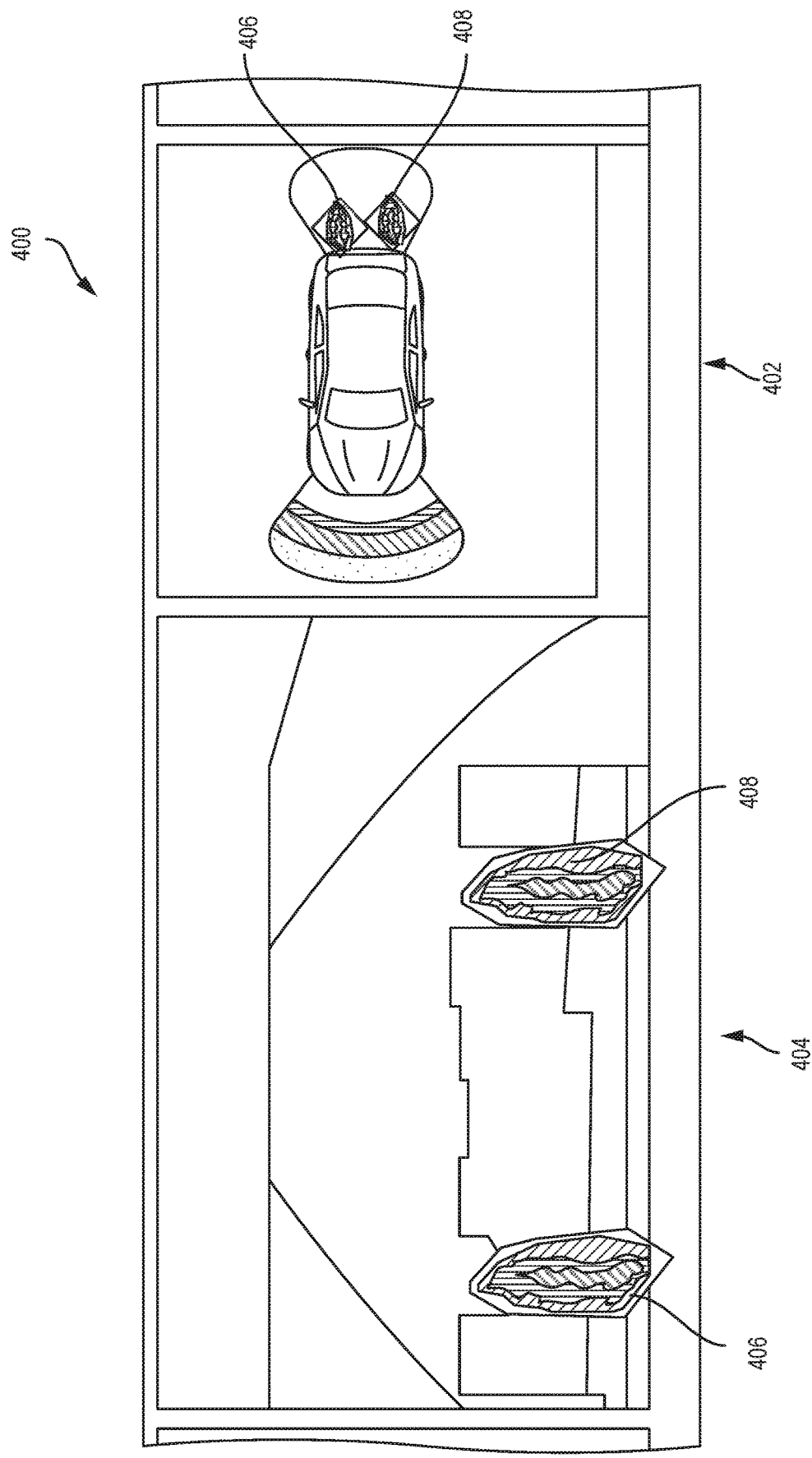
FIG. 4 shows example thermal images which may be obtained from the infrared cameras of FIG. 3.
Figure 5:
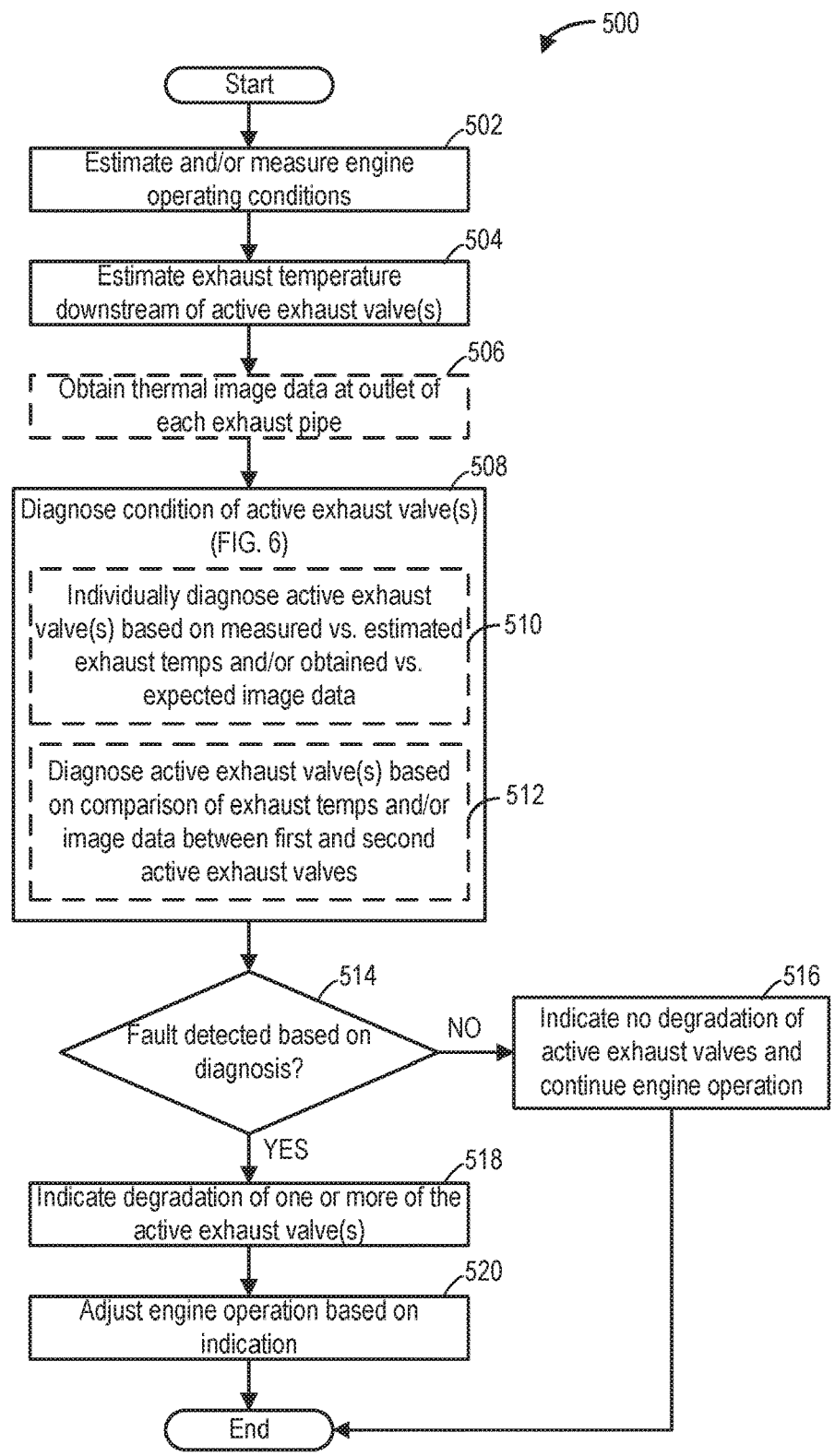
FIG. 5 shows a flow chart of an example method for diagnosing a condition of one or more active exhaust valves of an exhaust system.
Figure 6:
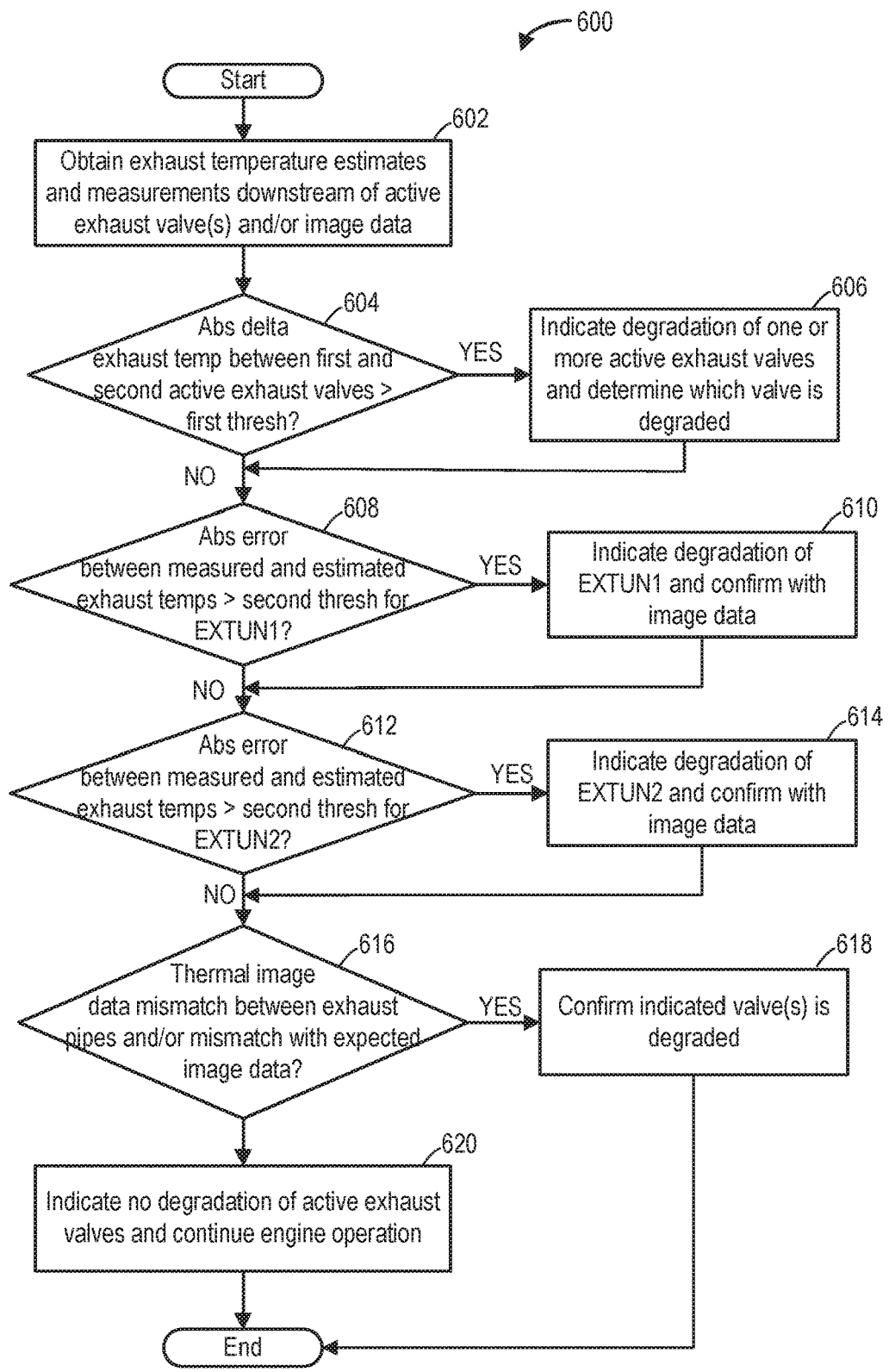
FIG. 6 shows a flow chart of an example method for determining which active exhaust valve(s) in a dual bank exhaust system including at least two active exhaust valves on separate banks is degraded.
Figure 7:
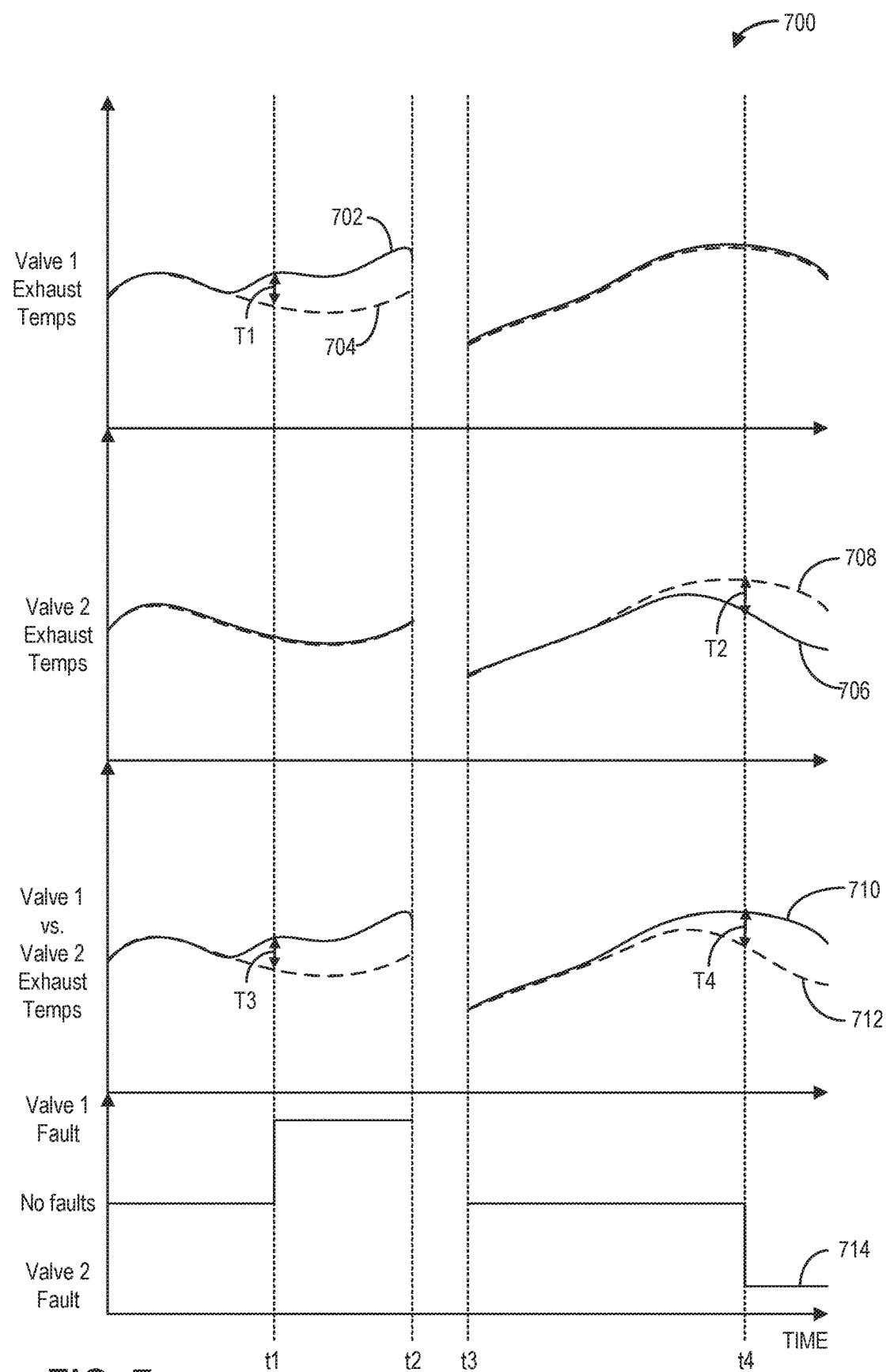
FIG. 7 shows a graph of example changes in exhaust temperatures downstream of first and second active exhaust valves, which are both measured and modeled, and resulting indications of degradation of the valves.

The following description relates to systems and methods for diagnosing one or more active exhaust valves in an exhaust system based on thermal data. An active exhaust valve may be positioned in an exhaust pipe (e.g., passage) downstream of a muffler, as shown in the vehicle system of FIG. 1. In some embodiments, the vehicle may include a single bank exhaust system with one active exhaust valve in an exhaust passage of the one bank (as shown in FIG. 1, for example). In other embodiments, the vehicle may include a dual bank exhaust system with two separate exhaust pipes, each including a different active exhaust valve, such as the dual bank exhaust system shown in FIG. 2. Thus, in this system, there may be two active exhaust valves, each located on a different exhaust bank. A temperature of exhaust downstream of each of the active exhaust valves may be measured, modeled, and/or imaged via infrared cameras. For example, as shown in FIG. 3, infrared cameras may be positioned at outlets of the vehicle's tailpipes and adapted to capture thermal image data of exhaust flowing from the active exhaust valves. Example thermal images that may be acquired by such devices are shown in FIG. 4. A condition of one or more of the active exhaust valves may be diagnosed via an individual or relative comparison of exhaust temperatures and/or thermal image data between the two banks, as shown by the method of FIG. 5. In one embodiment, as shown by the method of FIG. 6, degradation of one of the exhaust valves may be indicated by a relative comparison of exhaust temperatures between banks, while a determination of which valve is experiencing the degradation may be determined by individually analyzing measured and modeled temperatures of each of the active exhaust valves. Additionally, thermal data or images may be used to confirm the indication of degradation. Examples of indicating degradation of one of the two active exhaust valves based on measured and modeled temperatures is shown at FIG. 7. In this way, incorrect operation of one or both of the active exhaust valves may be determined under a variety of engine operating conditions, in any commanded position of the valves, thereby reducing degradation and increasing a longevity of the active exhaust valves.

Turning to FIG. 1, a schematic diagram of one cylinder of multi-cylinder engine 10, which may be included in a propulsion system of a vehicle 5, is shown. Vehicle 5 may be configured for on-road propulsion. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48. Exhaust manifold 48 may include a temperature sensor 72. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 coupled upstream of throttle 62 for measuring the flow rate of aircharge entering into the cylinder through throttle 62. Intake passage 42 may also include a manifold air pressure sensor 122 coupled downstream of throttle 62 for measuring manifold air pressure MAP.

In some embodiments, a compression device, such as a turbocharger or supercharger, including at least a compressor (not shown), may be arranged along intake manifold 44. For a turbocharger, the compressor may be at least partially driven by a turbine (not shown), for example via a shaft, the turbine arranged along exhaust manifold 48. For a supercharger, the compressor may be at least partially driven by the engine and/or an electric machine, and may not include a turbine.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 58 upstream of emission control device 70. Sensor 126 may be any suitable sensor for providing an indication of exhaust gas air-fuel ratio such as a linear oxygen sensor or UEGO (universal or wide-range exhaust gas oxygen), a narrow band (older systems treat as a two-state device) oxygen sensor or EGO, a HEGO (heated EGO), a NOx, HC, or CO sensor. Emission control device 70 is shown arranged along exhaust passage 58 downstream of exhaust gas sensor 126. The emission control device 70 may be a three way catalyst (TWC), SCR catalyst, NOx trap, a gasoline particulate filter (GPF), a combination of two or more of these devices, or one of various other emission control devices.

Further, engine 10 may include an exhaust gas recirculation (EGR) system (not shown) to help lower NOx and other emissions. The EGR system may be configured to recirculate a portion of exhaust gas from the engine exhaust to the engine intake. In one example, the EGR system may be a low pressure EGR system wherein exhaust gas is recirculated from downstream of gasoline particulate filter 70 to the engine intake.

The exhaust passage 58 may also include a muffler 72 and an active exhaust valve (also referred to as an exhaust tuning valve) 75 arranged downstream of the muffler 72. The exhaust passage 58 may also be referred to herein as an exhaust duct or exhaust pipe and may terminate at an exterior of the vehicle 5 as a (or coupled to) a tailpipe. A temperature sensor 76 may also be positioned downstream of the active exhaust valve 75.

The oxygen sensor(s) of vehicle 5 may be linear oxygen sensors or switching oxygen sensors. As an example, the oxygen sensors may be one of a UEGO sensor (universal or wide-range exhaust gas oxygen), a two-state oxygen sensor or EGO sensor, or a HEGO (heated EGO) sensor. Exhaust gas oxygen sensors 126 may assess a concentration of oxygen present in the exhaust gas and sense tailpipe exhaust oxygen concentrations about the emission control device 70. Exhaust gas sensor 126 may be a feed-gas oxygen sensor positioned upstream of emission control device 70 configured to sense feed-gas exhaust oxygen concentrations.

The air-fuel ratio of exhaust released from cylinders 30 may be determined by one or more of the oxygen sensors located in the exhaust stream of the engine. Based on the estimated exhaust air-fuel ratio, fuel injection to engine cylinders may be adjusted so as to control the air-fuel ratio of cylinder combustion. For example, fuel injection amounts to the cylinders may be adjusted based on a deviation of the exhaust air-fuel ratio, estimated based on the output of exhaust gas sensor 126 and a desired air-fuel ratio (such as a deviation from stoichiometry).

Vehicle 5 may be a hybrid vehicle with multiple sources of torque available to one or more vehicle wheels 55. In other examples, vehicle 5 is a conventional vehicle with only an engine, or an electric vehicle with only electric machine (s). In the example shown, vehicle 5 includes engine 10 and an electric machine 53. Electric machine 53 may be a motor or a motor/generator. Crankshaft 140 of engine 10 and electric machine 53 are connected via a transmission 57 to vehicle wheels 55 when one or more clutches 56 are engaged. In the depicted example, a first clutch 56 is provided between crankshaft 140 and electric machine 53, and a second clutch 56 is provided between electric machine 53 and transmission 57. Controller 12 may send a signal to an actuator of each clutch 56 to engage or disengage the clutch, so as to connect or disconnect crankshaft 140 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55. Electric machine 53 may also be operated as a generator to provide electrical power to charge battery 58, for example during a braking operation.

Controller 12 is shown in FIG. 1 as a microcomputer, including microprocessor unit 102, input/output ports 104, an electronic storage medium for executable programs and calibration values shown as read only memory 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; exhaust temperature downstream of the active exhaust valve 75 from sensor 76; exhaust temperature in the exhaust manifold from sensor 72, and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device, for example to alert the driver of faults in the engine or exhaust system.

Storage medium read-only memory 106 can be programmed with computer readable data representing instructions executable by processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, adjusting fuel injection may include adjusting pulse width signal FPW to electronic driver 68 to adjust the amount of fuel injected to the cylinder via fuel injector 66.

Figure 2:
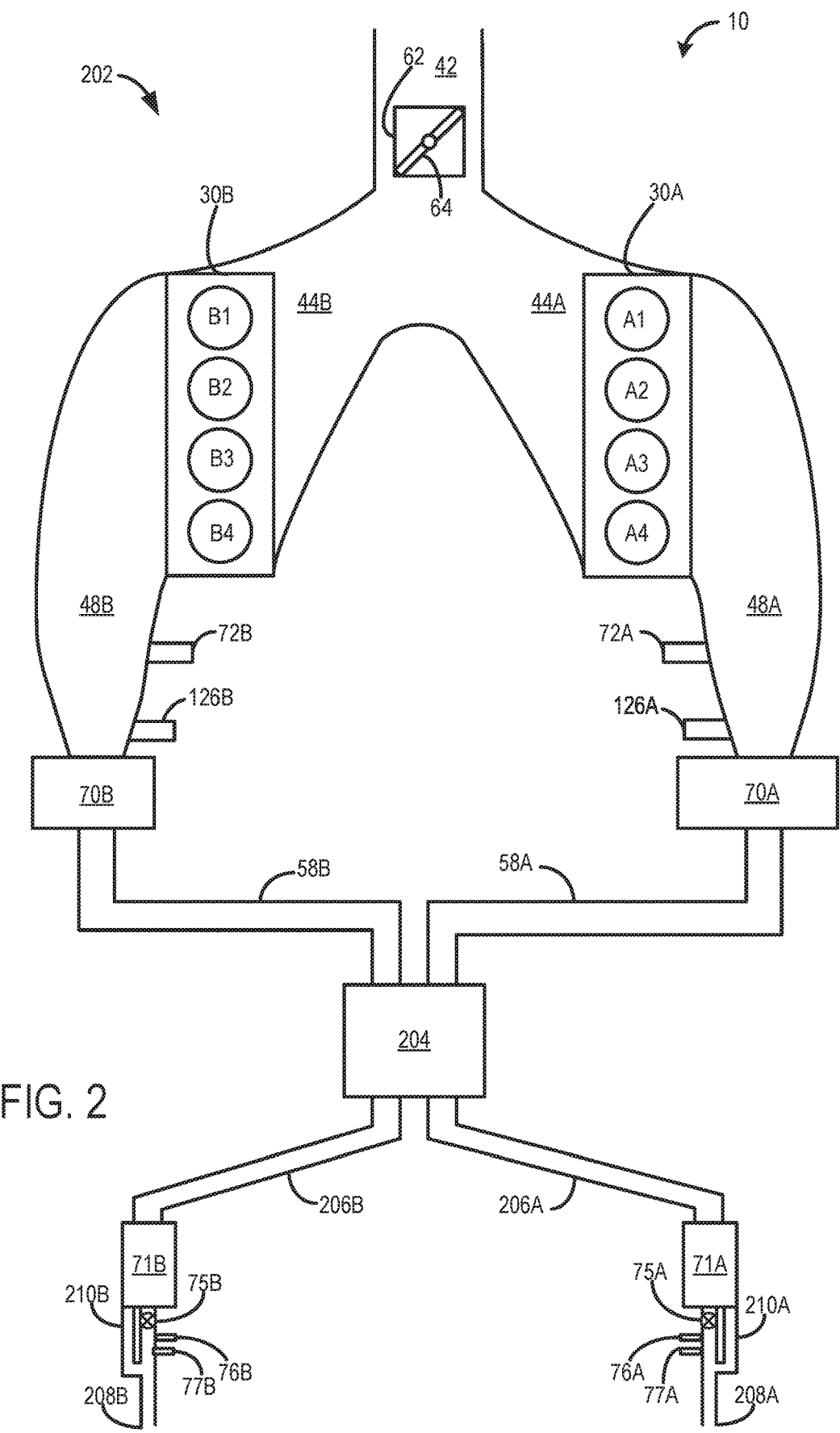
FIG. 2 schematically shows a V-engine with a dual bank exhaust system.

Turning to FIG. 2, an example version of engine 10 that includes multiple cylinders arranged in a V configuration (e.g., V-Engine) is shown as V-engine 202. Engine 202 includes a plurality of combustion chambers or cylinders 30. The plurality of cylinders 30 of engine 202 are arranged as groups of cylinders on distinct engine banks. In the depicted example, engine 202 includes two engine cylinder banks 30A, 30B. Thus, the cylinders are arranged as a first group of cylinders (four cylinders in the depicted example) arranged on first engine bank 30A and label A1-A4, and a second group of cylinders (four cylinders in the depicted example) arranged on second engine bank 30B labeled B1-B4. It will be appreciated that while the example depicted in FIG. 1 shows a V-engine with cylinders arranged on different banks, this is not meant to be limiting, and in alternate examples, the engine may be an in-line engine with all engine cylinders on a common engine bank.

Engine 202 can receive intake air via an intake passage 42 communicating with branched intake manifold 44A, 44B. Specifically, first engine bank 30A receives intake air from intake passage 42 via a first intake manifold 44A while second engine bank 30B receives intake air from intake passage 142 via second intake manifold 44B. While engine banks 30A, 30B are shown with a common intake manifold, it will be appreciated that in alternate examples, the engine may include two separate intake manifolds. The amount of air supplied to the cylinders of the engine can be controlled by adjusting a position of throttle 62 on throttle plate 64. Additionally, an amount of air supplied to each group of cylinders on the specific banks can be adjusted by varying an intake valve timing of one or more intake valves coupled to the cylinders.

Combustion products generated at the cylinders of first engine bank 30A are directed to one or more emission control devices in first exhaust manifold 48A where the combustion products are treated before being vented to the atmosphere. A first emission control device 70A is coupled to first exhaust manifold 48A. First emission control device 70A may include one or more exhaust catalysts. Exhaust gas generated at first engine bank 30A is treated at emission control device 70A Combustion products generated at the cylinders of second engine bank 30B are exhausted to the atmosphere via second exhaust manifold 48B. A second emission control device 70B is coupled to second exhaust manifold 48B. Second emission control device 70B may include one or more exhaust catalysts. Exhaust gas generated at second engine bank 30B is treated at emission control device 70B.

While FIG. 2 shows each engine bank coupled to respective underbody emission control devices, in alternate examples, each engine bank may be coupled to respective emission control devices 70A, 70B but to a common underbody emission control device positioned downstream in a common exhaust passageway.

Various sensors may be coupled to engine 202. For example, a first exhaust gas sensor 126A may be coupled to the first exhaust manifold 48A of first engine bank 30A, upstream of first emission control device 70A while a second exhaust gas sensor 126B is coupled to the second exhaust manifold 48B of second engine bank 30B, upstream of second emission control device 70B. In further examples, additional exhaust gas sensors may be coupled downstream of the emission control devices. Still other sensors, such as temperature sensors, may be included, for example, coupled to the underbody emission control device(s). As elaborated in FIG. 2, the exhaust gas sensors 126A and 126B may include exhaust gas oxygen sensors, such as EGO, HEGO, or UEGO sensors.

As shown in FIG. 2, the exhaust passages 58A, 58B of each bank may converge at a resonator 204. However, in alternate embodiments, the resonator may not be included in engine 202. After the resonator, the exhaust flow is split up into a first exhaust pipe 206A (on the first engine bank side) and second exhaust pipe 206B (on the second engine bank side), which may be continuations of the respective exhaust passages. First exhaust pipe 206A includes a first muffler 71A and a first active exhaust valve 75A positioned downstream of the first muffler 71A. When the first active exhaust valve 75A is open, exhaust flow exits the first muffler 71A via the first active exhaust valve 75A and continues on to a first outlet 208A of the first exhaust pipe 206A (which may be coupled to a first tailpipe). However, when the first active exhaust valve 75A is closed, the exhaust flow exits the first muffler 71A via a first bypass duct 210A. In this closed position, exhaust flow may be restricted via first bypass duct 210A. Similarly, second exhaust pipe 206B includes a second muffler 71B and a second active exhaust valve 75B positioned downstream of the second muffler 71B. Second active exhaust valve 75B functions similarly to first active exhaust valve 75A, as described above, and a second bypass duct 210B is included around second active exhaust valve 75B. The controller may adjust the positions of the first active exhaust valve 75A and the second active exhaust valve 75B (e.g., between open and closed) in order to control exhaust noise to a desired level (e.g., based on engine operating conditions).

Various temperature sensors may be included in the exhaust system of engine 202, including exhaust manifold temperature sensors 72A and 72B (adapted to measure temperature of exhaust gas within the exhaust manifold to which they are coupled), exhaust gas temperature sensors 76A and 76B (adapted to measure the exhaust temperature downstream of the active exhaust valve proximate to where it is positioned), and metal temperature sensors 77A and 77B (adapted to measure the temperature of the metal of the exhaust pipe to which it is coupled). In alternate embodiments, the exhaust system may not include some or all of these temperature sensors, and instead, temperatures may be modeled based on other engine operating conditions, as explained further herein.

Quick diagnosis of the active exhaust valves may not be possible. For example, current methods of diagnosing the active exhaust valve(s) may include utilizing position sensor feedback and implementing a diagnostic cycle that includes commanded the valve(s) to a certain number of closed and open positions before making a decision on whether or not the valve(s) is stuck. This diagnostic cycle may be a function of time and ambient temperature. Thus, this method, particularly in colder temperatures, may take a significant amount of time before a diagnosis is made (e.g., around 5 minutes). However, early diagnosis of the functioning of these valves may help to mitigate degradation of the valves via corrective action, such as repair or actuation of a stuck valve. Thus, the inventors herein have recognized that there is a need to diagnose the functioning of the active exhaust valves, including diagnosing whether they are in the commanded position.

In dual bank exhaust systems, as shown in FIG. 2, both active exhaust valves (e.g., valve 75A and valve 75B shown in FIG. 2), on the separate banks, are designed to behave uniformly to achieve uniform exhaust sound levels. For example, the two active exhaust valves may be commanded into a same position (e.g., open or closed) in order to achieve a desired and uniform exhaust sound level. Thus, the exhaust temperatures downstream of each of the active exhaust valves should be similar. Said another way, the relative temperature characteristics between the two banks, downstream of the active exhaust valves, should behave similarly at the same point in time (e.g., for the same engine operating conditions). Further, actual exhaust temperature conditions at each of the active exhaust valves may be assessed against expected conditions (e.g., via temperature models and/or expected temperature profile images) in order to diagnose the valves. For example, in vehicles with only a single bank exhaust system which includes a single exhaust passage with one active exhaust valve, actual exhaust temperature conditions of the active exhaust valve may be assessed against these expected conditions and/or expected, stored data.

In one example, a thermal, infrared camera coupled to the vehicle may be used to capture thermal image data of exhaust exiting the corresponding active exhaust valve (e.g., at a tailpipe of the vehicle, downstream of the active exhaust valve). The thermal image may show a temperature profile at the outlet of the tailpipe and/or exhaust pipe in which the active exhaust valve is positioned. In the case of a degraded valve (e.g., stuck open or closed), the thermal image representing the exhaust temperature profile at the active exhaust valve exit may exhibit varying image characteristics when compared to the active exhaust valve on the other bank (e.g., for a dual bank exhaust system) or when compared to expected image characteristics (e.g., for a single or dual bank exhaust system). For example, if the acquired thermal image is different than an expected thermal image for a commanded open valve, the active exhaust valve may be diagnosed as being stuck in a closed position (e.g., not in the commanded position).

FIG. 3 shows a schematic of a vehicle (which may be similar to vehicle 5 shown in FIG. 1 and may include an engine similar to engine 202 shown in FIG. 2) 300 including a dual bank exhaust system 302 located at a rear-end of the vehicle 300. The dual bank exhaust system 302 includes a first exhaust pipe 304A (which may be coupled to a first exhaust manifold of an engine at an upstream end, relative to a direction of exhaust gas flow 312 through the dual exhaust system) and a second exhaust pipe 304B (which may be coupled to a second exhaust manifold of the engine at an upstream end). The first exhaust pipe 304A includes a first active exhaust valve 306A disposed therein and is directly coupled to and terminates as a first tailpipe 308A. Similarly, the second exhaust pipe 304B includes a second active exhaust valve 306B disposed therein and is directly coupled to and terminates as a second tailpipe 308B.

In a first embodiment, a first infrared camera 310A is coupled at an exterior of the vehicle, in a vicinity of (e.g., proximate to) the first tailpipe 308A and is adapted to capture a thermal image visualizing a temperature profile of exhaust exiting and downstream of the first active exhaust valve. A second infrared camera 310B is coupled at an exterior of the vehicle, in a vicinity of (e.g., proximate to) the second tailpipe 308B and is adapted to capture a thermal image visualizing a temperature profile of exhaust exiting and downstream of the second active exhaust valve.

In a second embodiment, a single (e.g., only one) infrared camera 322 may be positioned proximate to a backup camera 320 of the vehicle. This single infrared camera may have a field of view of both exhaust streams exiting the exhaust system at the first tailpipe 308A and the second tailpipe 308B. In this way, the single infrared camera 322 may capture a thermal image visualizing (together) both a temperature profile of exhaust exiting and downstream of the first active exhaust valve and a temperature profile of exhaust exiting and downstream of the second active exhaust valve. This captured thermal image may then be split in half, symmetrically, and the left and right sides may be compared to one another (e.g., relatively) for changes or differences in the exhaust temperature profiles, either by a correlation method or by subtracting one side of the thermal image from the other and analyzing the difference plot. In another embodiment, each half of the thermal image (each half corresponding to a different one of the exhaust banks) may be compared to reference image data, as discussed further herein. Since the thermal image may be taken from near the backup camera, there may be increased noise. Thus, this method may not be employed at high speeds where it may be more difficult to capture and process an image. Instead, the thermal image form the single camera may be taken when the vehicle moves from a stationary position and/or when the vehicle speed is below a threshold and engine speed is above a threshold, since the exhaust gases may flare out more in this condition, thereby giving a higher quality image for comparison. In yet another example, a thermal image may be captured after a known change in exhaust valve position setting, for example, for a change in exhaust mode from a "quiet" mode to a "track" mode.

FIG. 4 shows example thermal images which may be obtained from the first and second infrared cameras shown in FIG. 3. Specifically, FIG. 4 shows a display 400 which may be displayed via an internal vehicle display screen or another display screen of the vehicle. Display 400 includes a first display area 402 showing a schematic, top-view of the vehicle (e.g., vehicle 300 of FIG. 3) and thermal image outputs 406 and 408 from two infrared cameras. In an alternate embodiment, as explained above, the thermal image outputs 406 and 408 may be obtained from a single infrared camera which is positioned to capture both streams of hot exhaust. For example, a first thermal image output (e.g., thermal image) 406 may be acquired via the first infrared camera 310A of FIG. 3 and a second thermal image output (e.g., thermal image) 408 may be acquired via the second infrared camera 310B of FIG. 3. Alternatively, the first thermal image output 406 and the second thermal image output 408 may be obtained from the same, centrally mounted infrared camera. Display 400 further includes a second display area 404 showing enlarged versions of the first thermal image output 406 and second thermal image output 408. As seen in the second display area 404, the first thermal image output 406 and second thermal image output 408 appear to be almost identical, thereby indicating an expected, similar exhaust temperature profile due to both active exhaust valves being in the same position. In alternate embodiments, if one of the active exhaust valves (e.g., one of valves 306A or 306B shown in FIG. 3) are degraded (such as being stuck closed when commanded open), the acquired thermal images (or thermal image data obtained via analyzing the thermal images) may not match. For example, the thermal image corresponding stuck closed valve may have a more uniform color area indicating a cooler temperature than the thermal image corresponding to the commanded open valve.

Turning now to FIG. 5, a flow chart of a method 500 for diagnosing a condition of one or more active exhaust valves of an exhaust system is shown. As explained above, an exhaust system of a vehicle may have one or more active exhaust valves (also referred to as exhaust tuning valves) adapted to control exhaust noise to a desired level (such as active exhaust valve 75 shown in FIG. 1, active exhaust valves 75A and 75B shown in FIG. 2, or active exhaust valves 306A and 306B shown in FIG. 3). For example, in a single bank exhaust system (such as a system to that shown in FIG. 1), one or more active exhaust valves may be positioned in a single exhaust bank. In a dual bank exhaust system, one or more active exhaust valves may be positioned in each of two exhaust banks. As one example, in a dual bank exhaust system, each exhaust bank may include its own active exhaust valve. However, the two active exhaust valves may be adjusted in coordination to achieve a desired exhaust noise level. As such, characteristics downstream of each of the active exhaust valves, such as exhaust temperature, may be expected to be similar when commanded into a same position. In a single bank exhaust system, characteristics downstream of the active exhaust valve may be expected to be similar to modeled and/or expected/stored data (for the current operating conditions). Instructions for carrying out method 500 and the rest of the methods included herein may be executed by a controller based on instructions stored on a memory of the controller and in conjunction with signals received from sensors of the engine system, such as the sensors described above with reference to FIGS. 1 and/or 2. The controller may employ engine actuators of the engine system to adjust engine operation, according to the methods described below.

The method begins at 502 and includes estimating and/or measuring engine operating conditions. Engine operating conditions may include engine speed and/or load, engine temperature, ambient temperature, exhaust manifold temperature, exhaust temperatures in the exhaust pipes, gas pressures, a temperature of the metal of the exhaust pipes in the exhaust system, mass air flow, etc. In one example, method 502 includes measuring an exhaust temperature downstream of each active exhaust valve via a temperature sensor arranged downstream of the corresponding active exhaust valve (e.g., temperature sensor 76 shown in FIG. 1 or temperature sensors 75A and 75B shown in FIG. 2). Method 502 may additionally include measuring the exhaust manifold temperature via a sensor arranged in each exhaust manifold (e.g., temperature sensors 72A and 72B shown in FIG. 2) or estimating the exhaust manifold temperature based on additional engine operating conditions and measuring a metal temperature of the exhaust pipes of the exhaust system via a sensor arranged at the exhaust pipes proximate to the active exhaust valves (e.g., temperature sensors 77A and 77B shown in FIG. 2).

At 504, the method includes estimating an exhaust temperature downstream of the active exhaust valve(s). For example, the method at 504 may include estimating a temperature of exhaust in an exhaust pipe or passage, downstream of where the active exhaust valve is positioned in the exhaust pipe or passage. In a dual bank exhaust system, such as the system shown in FIG. 2, an estimate of the exhaust temperature downstream of each active exhaust valve (e.g., downstream of active exhaust valve 75A and downstream of active exhaust valve 75B) may be determined. Estimating the exhaust temperature downstream of each active exhaust valve included in the exhaust system may include estimating, for each active exhaust valve, via a stored model in one example, the exhaust temperature downstream of the active exhaust valve based on the exhaust manifold temperature (e.g., the temperature of exhaust in the exhaust manifold upstream of the active exhaust valve which may be measured via a temperature sensor or estimated based on engine operating conditions, humidity, ambient temperature, etc.) and the drop in exhaust temperature at a location after the active exhaust valve (e.g., downstream of the valve, at the valve exit), which may be a function of a length of the exhaust pipe between the exhaust manifold and the active exhaust valve, temperature sensor placement relative to the valve, a commanded position of the active exhaust valve (e.g., open or closed), a metal temperature of the exhaust pipe in which the active exhaust valve is position (e.g., at a location proximate to the location of the active exhaust valve), ambient temperature, a convective heat transfer coefficient, and a specific heat constant. In one example, the method at 504 may include the controller inputting the time-varying, above-listed parameters (e.g., exhaust manifold temperature, commanded position of the active exhaust valve, metal temperature of the exhaust pipe, and ambient temperature) into in a look-up table or one or more maps, and receiving the estimated exhaust temperature downstream of the active exhaust valve as the output. For example, the estimated exhaust temperature may be hotter when the commanded position of the valve is open than when the commanded position is closed. The controller may perform this estimation for each of the active exhaust valves in the exhaust system.

At 506, the method may optionally include obtaining thermal image data at an outlet of each exhaust pipe including an active exhaust valve. Obtaining thermal image data may include obtaining a thermal image output via a thermal, infrared camera (such as infrared cameras 310A, 310B, and/or 322 shown in FIG. 3). The thermal image data may be the visual data presented in the image (e.g., the colors, patterns, etc. of the thermal image). The controller may also process the received thermal image(s) to determine an estimate of temperature at the outlet of the exhaust pipe(s), in some embodiments.

Continuing to 508, the method includes diagnosing a condition of one or more active exhaust valve(s) of the exhaust system. Diagnosing a condition of the one or more active exhaust valve(s) may include determining the active exhaust valve(s) are in the correct, commanded position or are stuck in and open or closed position (and not in the commanded position). Diagnosing the condition of the one or more active exhaust valve(s) may further include determining the active exhaust valve(s) are degraded and/or need replacing. The method at 508 may include, at 510, individually diagnosing each active exhaust valve based on a comparison (and difference) between measured and estimated exhaust temperatures downstream of the respective active exhaust valve (e.g., the exhaust temperature measured at 502 and estimated at 504) and/or based on a comparison (e.g., difference) between obtained (obtained at 506) and expected thermal image data. The method at 510 may be employed in single and dual bank exhaust systems. In one example, the expected thermal image data may include a stored thermal image and/or corresponding thermal image data. The stored thermal image for comparison to the obtained (e.g., acquired) thermal image may be selected from a plurality of expected thermal images stored in memory of the controller based on current operating conditions (e.g., a currently commanded position of the active exhaust valve, engine speed and/or load, exhaust manifold temperature, etc.). In this way, the method at 510 may compare measured or acquired data specific to the individual active exhaust valve to expected or estimated data for the individual active exhaust valve. The method at 508 may additionally or alternatively include diagnosing the active exhaust valves based on a comparison of exhaust temperatures and/or image data between first and second active exhaust valves (e.g., in a dual bank exhaust system including two active exhaust valves, one on each bank) at 512. The method at 512 may be employed in dual bank exhaust systems. For example, a measured exhaust temperature downstream of the first active exhaust valve in a first exhaust pipe on a first bank of the engine exhaust system may be compared to a measured exhaust temperature downstream of the second active exhaust valve in a second exhaust pipe on a second bank of the engine exhaust system. Further details on the method for diagnosing the active exhaust valve(s) are presented in the method of FIG. 6, as described further below.

The method proceeds to 514 to determine if a fault is detected based on the diagnosis at 508. The fault may include a determination that one or more of the active exhaust valves is degraded and needs replacement or is stuck in an open or closed position (and thus unable to be actuated to the commanded position). In a dual bank exhaust system, the detected fault may be a determination that one of the two active exhaust valves is faulted (without indicating which one) and/or a determination of which (or both) of the two active exhaust valves is faulted. If no fault is detected and it is determined that all active exhaust valves are functioning as expected (e.g., are in the commanded positions), the method continues to 516 to indicate no degradation of the active exhaust valves and continue engine operation. In some embodiments, this may include not setting any diagnostic flags and indicating in a memory of the controller that the active exhaust valves are functioning as commanded.

Alternatively, if a fault is detected at 514, the method proceeds to 518 to indicate degradation of one or more of the active exhaust valve(s). Indicating degradation may include indicating that one or more of the active exhaust valve(s) is degraded and needs servicing or replaced and/or indicating that (and which) active exhaust valves are in a stuck open or stuck closed position. The indicating may include setting a diagnostic flag and/or notifying an operator of the vehicle via a visual and/or audible indicator (e.g., via a dashboard or other display). At 520, the method includes adjusting engine operation based on the indication at 518. In one example, if one or more of the active exhaust valves is indicated as being stuck in an open or closed position, the method at 520 may include sending an electronic control signal (via one or more pulses, for example) to the indicated active exhaust valve in an effort to actuate and unstick the valve. For example, the method at 520 may include running a "self healing" routine which may include applying a series of actuations of the valve into an open and closed positions. In alternate embodiments, the method at 520 may additionally or alternatively include adjusting an alternate engine operating parameter to reduce exhaust noise and/or maintaining the degraded active exhaust valve(s) in the current position. One example of possible engine operating parameter adjustments at 520 may include, in response to an active exhaust valve being stuck closed, deactivating one or more cylinders on the same cylinder bank (which communicates with the stuck closed valve) and/or increasing exhaust temperatures (to burn off soot that may cause the valve to be stuck closed) via retarding spark or increasing post-injection amounts. In another embodiment, possible engine operating parameter adjustments at 520 may include derating the engine and limiting the engine power and/or commanding the valve(s) to a position that reduces exhaust backpressure on the engine. The method then ends.

Turning to FIG. 6, a method 600 is shown for determining which active exhaust valve(s) in a dual bank exhaust system including at least two active exhaust valves on separate banks (e.g., first and second active exhaust valves) is degraded. Method 600 may continue from the method at 508 in FIG. 5. As such, at 602, the method includes obtaining (e.g., receiving and/or determining at the controller) exhaust temperatures estimates and measurements downstream of the active exhaust valves and/or image data from the infrared cameras position at exhaust pipe outlets, downstream of the active exhaust valves. This data may be obtained according to the methods at 502, 504, and 506, as described above with reference to FIG. 5.

At 604, the method includes determining whether an absolute value of a delta exhaust temperature (e.g., exhaust temperature difference) between the first and second active exhaust valves is greater than a first threshold. As one example, the method at 604 may include determining whether an absolute value of a difference between the measured exhaust temperature downstream of the first active exhaust valve and the measured exhaust temperature downstream of the second active exhaust valve is less than the first threshold. The first threshold may be a non-zero threshold that may indicate that there may be an issue (e.g., degraded or stuck position) with one of the two active exhaust valves. In one embodiment, the first threshold is two degrees C. In another embodiment, the first threshold is in a range of two to three degrees C. In yet another embodiment, the first threshold is in a range of one to four degrees C. If the absolute delta is determined to be greater than the first threshold at 604, the method continues to 606 to indicate degradation of one or more of the first and second active exhaust valves and then determine which valve is degraded by continuing to 608. Indicating degradation may include setting a diagnostic flag in the memory of the controller and/or notifying the vehicle operator, as explained above at 518. The method also continues to 608 if the absolute delta is not determined to be less than the absolute value of the delta at 604. If the engine system is a single bank exhaust system (and not dual), the method may proceed directly from 602 to 608.

At 608, the method includes determining whether an absolute value of an error (e.g., difference) between the measured and estimated exhaust temperatures downstream of the first active exhaust valve (EXTUN1, which may be the only active exhaust valve in a single bank exhaust system) is greater than a second threshold. The measured exhaust temperature downstream of the first active exhaust valve may be determined at 502 and the estimated exhaust temperature downstream of the first active exhaust valve may be determined at 504, as described above with reference to FIG. 5. In alternate embodiments, the estimated exhaust temperature may instead be stored, reference temperature data based on the current engine operating conditions. The second threshold may be a non-zero threshold that may indicate that the first active exhaust valve is degraded or is in a different position than commanded (and thus may be stuck). In one embodiment, the second threshold is three degrees C. In another embodiment, the second threshold is a range of two to four degrees C. In yet another embodiment, the second threshold is in a range of 2.5 to 3.5 degrees C. The second threshold may be different than the first threshold. If it is determined at 608 that the absolute value of the error between the measured and estimated exhaust temps for the first active exhaust valve is greater than the second threshold, the method proceeds to 610 to indicate degradation of the first active exhaust valve and confirm the degradation with thermal image data (as described further below with reference to 616). The method then continues to 612.

At 612, the method includes determining whether an absolute valve of an error (e.g., difference) between the measured and estimated exhaust temperatures downstream of the second active exhaust valve (EXTUN2) is greater than the second threshold. The measured exhaust temperature downstream of the second active exhaust valve may be determined at 502 and the estimated exhaust temperature downstream of the second active exhaust valve may be determined at 504, as described above with reference to FIG. 5. If it is determined at 612 that the absolute value of the error between the measured and estimated exhaust temps for the second active exhaust valve is greater than the second threshold, the method proceeds to 614 to indicate degradation of the second active exhaust valve and confirm the degradation with thermal image data (as described further below with reference to 616). The method then continues to 616.

At 616, the method includes determining whether there is thermal image data mismatch between the exhaust pipes (e.g., the first exhaust pipe with the first active exhaust valve positioned therein and the second exhaust pipe with the second active exhaust valve positioned therein) and/or mismatch with expected (and stored) thermal image data. For example, in one embodiment, the method at 616 may include comparing thermal images acquired at the outlet of each of the two exhaust pipes (in the dual bank exhaust system) and confirming degradation of one or more of the active exhaust valves at 618 in response to there being a mismatch between the compared thermal images. A mismatch in the images may include the two images being greater than a threshold percentage (e.g., 5%, 10%, or 10-30%) different than one another. As an example, an image recognition and processing algorithm may be stored in memory of the controller and may analyze each thermal image and determine how closely the analyzed images match and then determine whether they mismatch by the threshold percentage or greater. In another embodiment, the method at 616 may include comparing a thermal image acquired at the outlet of the first exhaust pipe with a stored, expected thermal image (as described above with reference to 510 of FIG. 5) and comparing a thermal image acquired at the outlet of the second exhaust pipe with a stored, expected thermal image (which may be for a specific range of engine speed and load, as one example). This may be performed automatically for both active exhaust valves or for the specific valve indicated as being degraded based on the temperature analysis (e.g., at 610 and/or 614). If the controller determines there is a mismatch between the expected thermal image and the thermal image of the indicated valve(s) (similar to as described above), the method proceeds to 618 to confirm that the indicated active exhaust valve is degraded.

Further, in some embodiments, confirming degradation at 618 and/or indicating degradation at 610 and/or 614 may further include indicating how the indicated valve is degraded (e.g., stuck open or stuck closed). For example, if the acquired thermal image for one of the valves appears to have a cooler temperature profile (e.g., lower temperature)

than the expected image, the controller may determine the indicated valve is stuck in a closed position. As another example, if the measured exhaust temperature downstream of the indicated valve is higher than the modeled temperature, the controller may determine that the indicated valve is stuck in an open position.

Returning to 616, if there is no mismatch in thermal detail, the method may proceed to 620 to indicate no degradation of the active exhaust valves and continue current engine operation. The method then ends.

FIG. 7 shows a graph 700 of changes in exhaust temperatures downstream of first and second active exhaust valves (in a dual bank exhaust system), which are both measured and modeled, and resulting indications of degradation of the valves. All exhaust temperatures described with reference to FIG. 7 are temperature measured or modeled downstream (e.g., at an exit) of a respective active exhaust valve arranged in an exhaust pipe. The modeled exhaust temperatures are estimated according to the method described above with reference to 504 of FIG. 5. In the example of FIG. 7, there are two active exhaust valves ("Valve 1" and "Valve 2) which are arranged in separate exhaust pipes of a dual bank exhaust system, such as the system shown in FIG. 2. Specifically, graph 700 shows a comparison of changes in a measured exhaust temperature downstream of Valve 1 at 702 to changes in a modeled exhaust temperature downstream of Valve 1 at plot 704, a comparison of changes in measured exhaust temperature downstream of Valve 2 at 706 to changes in a modeled exhaust temperature downstream of Valve 2 at plot 708, a comparison of changes in the measured exhaust temperature of Valve 1 at plot 710 to changes in the measured exhaust temperature of Valve 2 at plot 712, and changes in indicating a fault (e.g., degradation) in Valve 1, Valve 2, or neither of Valves 1 and 2 at plot 714.

Prior to time t1, the measured and modeled exhaust temperatures for Valve 1 and Valve 2 are close to one another and no fault in the valves is indicated. However, at time t1, the measured exhaust temperature of Valve 1 (plot 702) deviates from the modeled exhaust temperature of Valve 1 (plot 704) by greater than a threshold, T1. Further, the measured exhaust temperature of Valve 1 (plot 710) deviates from the measured exhaust temperature of Valve 2 (plot 712) by greater than a threshold, T3. There is no significant (e.g., greater than a threshold) deviation between the measured and modeled exhaust temperatures at Valve 2. Thus, the controller indicates a fault in Valve 1 at time t1.

After a period of time (which may include servicing or replacing Valve 1 or actuating Valve 1, via pulses, until Valve 1 becomes unstuck), at time t3, all measured and modeled temperature of the valves again match fairly closely. Thus, no faults are indicated for Valves 1 and 2. Prior to time t4, the measured exhaust temperature of Valve 2 starts deviating from the modeled exhaust temperature of Valve 2 (plot 708) and the measured exhaust temperature of Valve 1 (plot 710). As a result, the controller indicates a fault in Valve 2 at time t4 when these deviations increase above respective thresholds T2 and T4.

While FIG. 7 shows indicating faults in the two active exhaust valves based on measured and modeled exhaust temperatures, in alternate embodiments, the faults may first be confirmed by comparing acquired thermal images downstream of the active exhaust valves. Further, in some embodiments, faults in the valves may be indicated based on analysis of thermal images alone and not based on exhaust temperatures.

In this way, a condition of one or more active exhaust valves arranged in an exhaust system, and adapted to control exhaust noise, may be diagnosed based on exhaust temperatures and/or thermal image data acquired downstream of the valves. In a dual bank exhaust system including separate exhaust pipes, each with a different active exhaust valve, the active exhaust valves may be diagnosed based on both or either of an individual (for each valve) and relative comparison (between the two valves) of exhaust temperature and/or image data. As a result, diagnosis of the active exhaust valves may be performed under all engine operating conditions and commanded positions of the active exhaust valves. The technical effect of indicating degradation of a first exhaust valve positioned in a first exhaust pipe of a first engine bank based on a difference between a first temperature of exhaust downstream of the first exhaust valve and a second temperature of exhaust downstream of a second exhaust valve positioned in a second exhaust pipe of a second engine bank is more quickly diagnosing the first exhaust valve (and/or the second exhaust valve), at an earlier time, thereby reducing degradation and increasing longevity of the valves.

As one embodiment, a method includes indicating degradation of a first exhaust valve positioned in a first exhaust pipe of a first engine bank based on a difference between a first temperature of exhaust downstream of the first exhaust valve and a second temperature of exhaust downstream of a second exhaust valve positioned in a second exhaust pipe of a second engine bank. In a first example of the method, the method further includes adjusting an engine operating parameter in response to indicating degradation of the first exhaust valve. A second example of the method optionally includes the first example and further includes, wherein the first temperature is measured via a first temperature sensor arranged downstream of the first exhaust valve and the second temperature is measured via a second temperature sensor arranged downstream of the second exhaust valve. A third example of the method optionally includes one or more of the first and second examples and further includes, wherein the indicating degradation includes indicating degradation of the first exhaust valve in response to the difference between the first temperature and the second temperature being greater than a first threshold and a difference between the first temperature and an expected temperature of exhaust downstream of the first exhaust valve being greater than a second threshold. A fourth example of the method optionally includes one or more of the first through third examples and further includes, wherein the expected temperature of exhaust downstream of the first exhaust valve is determined based on a temperature of exhaust in an exhaust manifold to which the first exhaust pipe is coupled, a length of the first exhaust pipe between the exhaust manifold and the first exhaust valve, a commanded position of the first exhaust valve, and ambient temperature. A fifth example of the method optionally includes one or more of the first through fourth examples and further includes additionally indicating degradation of the second exhaust valve in response to the difference between the first temperature and the second temperature being greater than the first threshold and a difference between the second temperature and an expected temperature of exhaust downstream of the second exhaust valve being greater than the second threshold. A sixth example of the method optionally includes one or more of the first through fifth examples and further includes, wherein the first temperature is modeled based on a first exhaust manifold temperature of an exhaust manifold to which the first exhaust pipe is coupled, a length of the first exhaust pipe between the exhaust manifold and a position of the first exhaust valve, and a commanded position of the first exhaust valve and wherein the second temperature is modeled based on a second exhaust manifold temperature of an exhaust manifold to which the second exhaust pipe is coupled, a length of the second exhaust pipe between the exhaust manifold and a position of the second exhaust valve, and a commanded position of the second exhaust valve. A seventh example of the method optionally includes one or more of the first through sixth examples and further includes, wherein the first temperature is visualized via a thermal image obtained from a first thermal imaging device arranged at an outlet of the first exhaust pipe and wherein the second temperature is visualized via a thermal image obtained from a second thermal imaging device arranged at an outlet of the second exhaust pipe. An eighth example of the method optionally includes one or more of the first through seventh examples and further includes, wherein the first exhaust valve and the second exhaust valve are actuated to a same position in response to a desired exhaust noise level. A ninth example of the method optionally includes one or more of the first through eighth examples and further includes, wherein the first exhaust valve is positioned downstream of a first muffler arranged in the first exhaust pipe and wherein the second exhaust valve is positioned downstream of a second muffler arranged in the second exhaust pipe, wherein exhaust in the first muffler does not mix with exhaust in the second muffler.

As another embodiment, a method includes indicating degradation of an exhaust valve positioned in an exhaust pipe and adjustable to reduce noise based on a temperature of exhaust downstream of the exhaust valve; and in response to indicating degradation, confirming the exhaust valve is degraded based on a thermal image representing a temperature of exhaust exiting the exhaust valve at a tailpipe of a vehicle. In a first example of the method, in response to confirming the exhaust valve is degraded, notifying an operator of the vehicle via a visual or audible indicator. A second example of the method optionally includes the first example and further includes, in response to confirming the exhaust valve is degraded, adjusting an engine operating parameter. A third example of the method optionally includes one or more of the first and second examples and further includes, wherein indicating degradation of the exhaust valve based on the temperature of exhaust downstream of the exhaust valve includes indicating degradation of the exhaust valve in response to an absolute value of a difference between a first exhaust temperature measured downstream of the exhaust valve and a second exhaust temperature downstream of the exhaust valve, the second exhaust temperature modeled based on an exhaust manifold temperature of an exhaust manifold coupled to the exhaust pipe upstream of the exhaust valve, a length of the exhaust pipe between the exhaust manifold and a position of the exhaust valve in the exhaust pipe, and a commanded position of the exhaust valve, being greater than a threshold. A fourth example of the method optionally includes one or more of the first through third examples and further includes, wherein the exhaust valve is arranged downstream of a muffler disposed in the exhaust pipe. A fifth example of the method optionally includes one or more of the first through fourth examples and further includes, wherein confirming the exhaust valve is degraded based on the thermal image includes comparing the thermal image, acquired via an infrared camera arranged proximate to the tailpipe, to an expected thermal image, for current engine operating conditions, stored in a memory of a controller of an engine and confirming the exhaust valve is degraded in response to the acquired thermal image being a threshold percentage different than the expected image. A sixth example of the method optionally includes one or more of the first through fifth examples and further includes, wherein the exhaust pipe is a first exhaust pipe of a dual bank exhaust system, the exhaust valve is a first exhaust valve, and the tailpipe is a first tailpipe, wherein the thermal image is a first thermal image acquired via an infrared camera arranged proximate to the first tailpipe, and wherein confirming the first exhaust valve is degraded based on the first thermal image includes comparing the first thermal image to a second thermal image acquired via an infrared camera arranged proximate to a second tailpipe coupled to a second exhaust pipe including a second exhaust valve and confirming the first exhaust valve is degraded in response to the acquired first thermal image being a threshold percentage different than the acquired second thermal image.

As yet another embodiment, a system for a vehicle includes a first exhaust pipe including a first muffler and a first active exhaust valve positioned downstream of the first muffler; a second exhaust pipe including a second muffler and a second active exhaust valve positioned downstream of the second muffler, where the first and second active exhaust valves are adjustable to a same position to control exhaust noise to a desired level; and a controller with computer readable instructions stored on non-transitory memory that when executed during operation of the vehicle, cause the controller to: indicate degradation of one of the first active exhaust valve and the second active exhaust valve in response to an absolute value of a difference between a first exhaust temperature downstream of the first active exhaust valve and a second exhaust temperature downstream of the second active exhaust valve being greater than a threshold. In a first example of the system, the instructions further include instructions that cause the controller to determine and indicate which of the first active exhaust valve and the second active exhaust valve is degraded based on a first difference between the first exhaust temperature and an expected, modeled exhaust temperature downstream of the first active exhaust valve and a second difference between the second exhaust temperature and an expected, modeled exhaust temperature downstream of the second active exhaust valve. A second example of the system optionally includes the first example and further includes at least one infrared camera positioned at a rear-end of the vehicle, proximate to each of an outlet of the first exhaust pipe and an outlet of the second exhaust pipe and wherein the instructions further include instructions for indicating which of the first active exhaust valve and second active exhaust valve is degraded based on a thermal image acquired from the at least one infrared camera.

In another representation, a system for a vehicle may comprise: an exhaust pipe including a muffler and an active exhaust valve positioned downstream of the muffler, exhaust pipe extending between engine and atmosphere, where the active exhaust valve is adjustable to reduce noise; an infrared camera positioned proximate to an outlet of the exhaust pipe; and a controller with computer readable instructions stored on non-transitory memory that when executed during operation of the vehicle, cause the controller to: indicate degradation of the active exhaust valve based on a thermal image, acquired from the infrared camera, representing a temperature of exhaust exiting the active exhaust valve during engine operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
 operating an electronic controller programmed with non-transitory instructions for executing the following action: indicating degradation of a first exhaust valve positioned in a first exhaust pipe of a first engine bank based on a difference between a first temperature of exhaust downstream of the first exhaust valve and a second temperature of exhaust downstream of a second exhaust valve positioned in a second exhaust pipe of a second engine bank.

2. The method of claim 1, wherein the instructions further include adjusting an engine operating parameter in response to indicating degradation of the first exhaust valve.

3. The method of claim 1, wherein the first temperature is measured via a first temperature sensor arranged downstream of the first exhaust valve and the second temperature is measured via a second temperature sensor arranged downstream of the second exhaust valve.

4. The method of claim 3, wherein the indicating degradation includes indicating degradation of the first exhaust valve in response to the difference between the first temperature and the second temperature being greater than a first threshold and a difference between the first temperature and an expected temperature of exhaust downstream of the first exhaust valve being greater than a second threshold.

5. The method of claim 4, wherein the expected temperature of exhaust downstream of the first exhaust valve is determined based on a temperature of exhaust in an exhaust manifold to which the first exhaust pipe is coupled, a length of the first exhaust pipe between the exhaust manifold and the first exhaust valve, a commanded position of the first exhaust valve, and ambient temperature.

6. The method of claim 4, wherein the instructions further include additionally indicating degradation of the second exhaust valve in response to the difference between the first temperature and the second temperature being greater than the first threshold and a difference between the second temperature and an expected temperature of exhaust downstream of the second exhaust valve being greater than the second threshold.

7. The method of claim 1, wherein the first temperature is modeled based on a first exhaust manifold temperature of an exhaust manifold to which the first exhaust pipe is coupled, a length of the first exhaust pipe between the exhaust manifold and a position of the first exhaust valve, and a commanded position of the first exhaust valve and wherein the second temperature is modeled based on a second exhaust manifold temperature of an exhaust manifold to which the second exhaust pipe is coupled, a length of the second exhaust pipe between the exhaust manifold and a position of the second exhaust valve, and a commanded position of the second exhaust valve.

8. The method of claim 1, wherein the first temperature is visualized via a thermal image obtained from a first thermal imaging device arranged at an outlet of the first exhaust pipe and wherein the second temperature is visualized via a thermal image obtained from a second thermal imaging device arranged at an outlet of the second exhaust pipe.

9. The method of claim 1, wherein the first exhaust valve and the second exhaust valve are actuated to a same position in response to a desired exhaust noise level.

10. The method of claim 1, wherein the first exhaust valve is positioned downstream of a first muffler arranged in the first exhaust pipe and wherein the second exhaust valve is positioned downstream of a second muffler arranged in the second exhaust pipe, wherein exhaust in the first muffler does not mix with exhaust in the second muffler.

11. A method, comprising:
 operating an electronic controller programmed with non-transitory instructions for executing the following action:
 indicating degradation of an exhaust valve positioned in an exhaust pipe and adjustable to reduce noise based on a temperature of exhaust downstream of the exhaust valve; and
 in response to indicating degradation, confirming the exhaust valve is degraded based on a thermal image representing a temperature of exhaust exiting the exhaust valve at a tailpipe of a vehicle,
 wherein indicating degradation of the exhaust valve based on the temperature of exhaust downstream of the exhaust valve includes indicating degradation of the exhaust valve in response to an absolute value of a difference between a first exhaust temperature measured downstream of the exhaust valve and a second exhaust temperature downstream of the exhaust valve, the second exhaust temperature modeled based on an exhaust manifold temperature of an exhaust manifold coupled to the exhaust pipe upstream of the exhaust valve, a length of the exhaust pipe between the exhaust manifold and a position of the exhaust valve in the exhaust pipe, and a commanded position of the exhaust valve, being greater than a threshold.

12. The method of claim 11, wherein the instructions further include in response to confirming the exhaust valve is degraded, notifying an operator of the vehicle via a visual or audible indicator.

13. The method of claim 12, wherein the instructions further include, in response to confirming the exhaust valve is degraded, adjusting an engine operating parameter.

14. The method of claim 11, wherein the exhaust valve is arranged downstream of a muffler disposed in the exhaust pipe.

15. The method of claim 11, wherein confirming the exhaust valve is degraded based on the thermal image includes comparing the thermal image, acquired via an infrared camera arranged proximate to the tailpipe, to an expected thermal image, for current engine operating conditions, stored in a memory of a controller of an engine and confirming the exhaust valve is degraded in response to the acquired thermal image being a threshold percentage different than the expected image.

16. The method of claim 11, wherein the exhaust pipe is a first exhaust pipe of a dual bank exhaust system, the exhaust valve is a first exhaust valve, and the tailpipe is a first tailpipe, wherein the thermal image is a first thermal image acquired via an infrared camera arranged proximate to the first tailpipe, and wherein confirming the first exhaust valve is degraded based on the first thermal image includes comparing the first thermal image to a second thermal image acquired via an infrared camera arranged proximate to a second tailpipe coupled to a second exhaust pipe including a second exhaust valve and confirming the first exhaust valve is degraded in response to the acquired first thermal image being a threshold percentage different than the acquired second thermal image.

17. A system for a vehicle, comprising
a first exhaust pipe including a first muffler and a first active exhaust valve positioned downstream of the first muffler;
a second exhaust pipe including a second muffler and a second active exhaust valve positioned downstream of the second muffler, where the first and second active exhaust valves are adjustable to a same position to control exhaust noise to a desired level; and
a controller with computer readable instructions stored on non-transitory memory that when executed during operation of the vehicle, cause the controller to:
indicate degradation of one of the first active exhaust valve and the second active exhaust valve in response to an absolute value of a difference between a first exhaust temperature downstream of the first active exhaust valve and a second exhaust temperature downstream of the second active exhaust valve being greater than a threshold.

18. The system of claim 17, wherein the instructions further include instructions that cause the controller to determine and indicate which of the first active exhaust valve and the second active exhaust valve is degraded based on a first difference between the first exhaust temperature and an expected, modeled exhaust temperature downstream of the first active exhaust valve and a second difference between the second exhaust temperature and an expected, modeled exhaust temperature downstream of the second active exhaust valve.

19. The system of claim 17, further comprising at least one infrared camera positioned at a rear-end of the vehicle, proximate to each of an outlet of the first exhaust pipe and an outlet of the second exhaust pipe and wherein the instructions further include instructions for indicating which of the first active exhaust valve and second active exhaust valve is degraded based on a thermal image acquired from the at least one infrared camera.

\* \* \* \* \*